Figure 1:
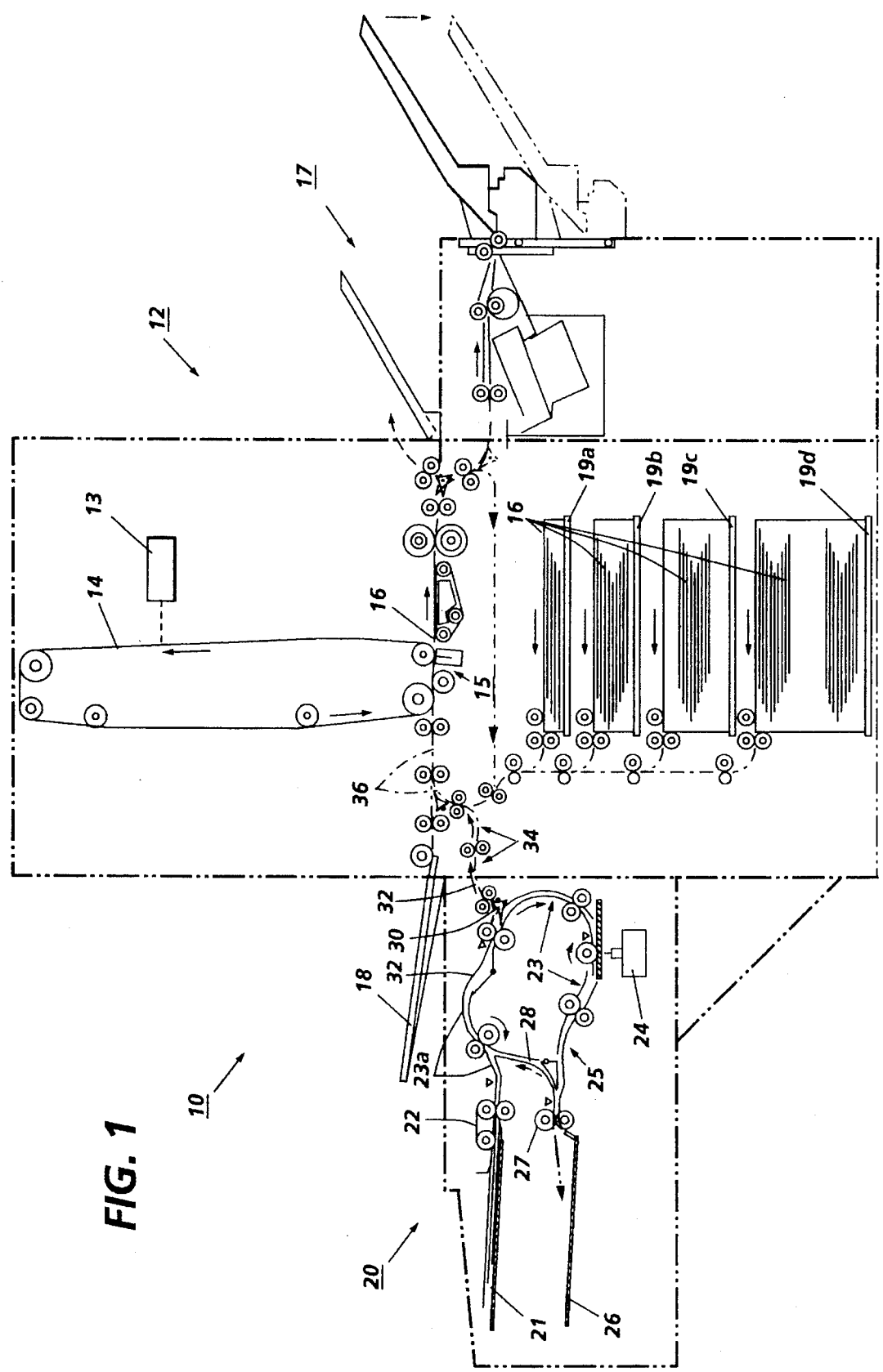

United States Patent [19]
Yonovich

[11] Patent Number: 5,496,019
[45] Date of Patent: Mar. 5, 1996

[54] DUAL FUNCTION SHEET FEEDER

[75] Inventor: John R. Yonovich, Shortsville, N.Y.

[73] Assignee: Xerox Corporation, Stamford, Conn.

[21] Appl. No.: 232,980

[22] Filed: Apr. 25, 1994

[51] Int. Cl.$^6$ ................................................ B65H 5/00
[52] U.S. Cl. ......................... 271/3.19; 271/9.05; 271/288; 271/301
[58] Field of Search ................................ 271/3.14, 3.19, 271/9.05, 9.06, 9.07, 288, 298, 301, 302, 303; 355/313

[56] References Cited

U.S. PATENT DOCUMENTS

| | | | |
|---|---|---|---|
| 4,211,483 | 7/1980 | Hannigan et al. | 355/313 |
| 4,391,504 | 7/1983 | Acquaviva | 355/3 |
| 4,496,984 | 1/1985 | Stoffel | 358/293 |
| 4,769,674 | 9/1988 | Kitajima et al. | 355/313 |
| 4,834,360 | 5/1989 | Acquaviva | 271/3.1 |

Primary Examiner—William E. Terrell
Assistant Examiner—Tamara Kelly

[57] ABSTRACT

A modular dual function sheet feeder/separator system for an electronic document imaging and printing system with an electronic document imaging station, a printing engine, an externally exposed sheet stacking tray, a sheet feeder/separator for separating and feeding documents from the sheet stacking tray, and at least two selectably different sheet feeding paths for the sheets stacked in the sheet stacking tray after they are separated and initially fed, the two sheet feeding paths being a first sheet path for feeding documents to the electronic document imaging station to be electronically imaged in a first operating mode and a second sheet path for feeding sheets to the printing engine in a second operating mode, and a sheet path selector for selecting between the first and second sheet paths in response to selecting between the first and second operating modes, wherein in the first operating mode the sheet stacking tray contains documents to be electronically imaged and the documents are fed through the first sheet path to be electronically imaged, and wherein in the second mode the sheet stacking tray contains special copy sheets which are fed by the second sheet path into the printing engine to be printed. The dual mode module is preferably removably mounted to one side of the print engine at its sheet printing path level.

5 Claims, 1 Drawing Sheet

U.S. Patent     Mar. 5, 1996     5,496,019

DUAL FUNCTION SHEET FEEDER

Cross-reference is made to two commonly assigned U.S. applications disclosing aspects of the document stack feeder/separator and document electronic imager example herein; application Ser. Nos. 08/134,775 and 08/135,097 filed Oct. 12, 1993, Attorney Docket Nos. D/93442 and D/93442Q.

As disclosed herein, a dual mode system is provided for utilizing a common, shared sheet input feeding system for either stacks of original documents to be electronically imaged or stacks of special copy sheets to be fed for being printed.

As disclosed in the embodiment herein, this may desirably be provided in a modular unit connecting with a digital printing engine to provide both an auxiliary optional copy sheet input source as well as an original document imager for inputting electronic images to that (or another, networked) printing engine. The disclosed system can simplify and reduce the costs of electronic printing systems. The disclosed system can be used with a wide variety of different electronic printing engines, document feeders and electronic imaging systems, including networked systems.

Examples of some recent patents relating to network environments of plural remote terminal shared users of networked printers include Xerox Corporation U.S. Pat. Nos. 5,243,518; 5,226,112; 5,170,340 and 5,287,194. Some recent patents on this subject by others include U.S. Pat. Nos. 5,113,355, 5,113,494 (originally filed Feb. 27, 1987), U.S. Pat. Nos. 5,181,162, 5,220,674, and 5,247,670. Further by way of background, some of the following earlier Xerox Corporation U.S. Pats. also include examples of networked systems with printers: U.S. Pat. Nos. 5,153,577; 5,113,517; 5,072,412; 5,065,347; 5,008,853; 4,947,345 (also multifunction machines); U.S. Pat. Nos. 4,939,507; 4,937,036; 4,920,481; 4,914,586; 4,899,136; 4,063,220; 4,099,024; 3,958,088; 3,920,895 and 3,597,071 (also multifunction machines).

Some other network systems related publications include "Xerox System Integration Standard Printing Protocol XSIS 118404", April, 1984; "Printing Protocol-Xerox System Integration Standard"© 1990 by Xerox Corporation, XNSS 119005 May, 1990; "Xerox Network Systems Architecture", "General Information Manual", XNSG 068504 April, 1985, with an extensive annotated bibliography,© 1985 by Xerox Corporation; "Interpress™: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System"© MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June, 1987.

Further by way of background, it is a known desirable feature of copiers and printers to provide a special copy sheet or "bypass" tray (such as 18) extendingly mounted from one side thereof, to feed in special copy sheets such as covers, transparencies, colored or unusual paper stock, etc.. Such a bypass tray is conveniently directly accessible externally by the operator, i.e., it does not require opening machine covers and/or pulling out and reloading one of the regular internal paper trays or cassettes in order to feed one or more desired special copy sheets.

One specific feature of the embodiment disclosed herein is to provide a dual mode sheet feeder/separator system for an electronic document imaging and printing system with an electronic document imaging station, a printing engine, an externally accessible sheet stacking tray, a sheet feeder/separator for separating and feeding documents from said sheet stacking tray, and at least two selectably different sheet feeding paths for the sheets stacked in said sheet stacking tray after they are separated and initially fed by said sheet feeder/separator operatively connecting with said sheet stacking tray, said two selectably different sheet feeding paths comprising a first sheet path for feeding documents to said electronic document imaging station to be electronically imaged in a first operating mode and a second sheet path for feeding sheets to said printing engine in a second operating mode, and a sheet path selection system for selecting between said first and second sheet paths in response to selecting between said first and second operating modes, wherein in said first operating mode said sheet stacking tray contains documents to be electronically imaged and said documents are fed through said first sheet path to be electronically imaged, and wherein in said second mode said sheet stacking tray contains special copy sheets which are fed by said second sheet path into said printing engine to be printed.

Further specific features provided by the system disclosed herein, individually or in combination, include those wherein said first sheet path for feeding documents to said electronic document imaging station to be electronically imaged in said first operating mode further includes a return path for returning said documents to be restacked at or adjacent to said sheet stacking tray; and/or wherein said electronic document imaging station, said sheet stacking tray, said sheet feeder/separator and said first and second sheet paths comprise an integral modular unit removably mounted to said printing engine and physically communicating therewith via said second sheet path; and/or wherein said electronic document imaging station is electronically connected to said printing engine to provide electronic images for printing by said printing engine; and/or wherein said printing engine has an intermediate sheet printing path and said modular unit is mounted to one side of such printing engine approximately at said vertical level of said intermediate sheet printing path, at a vertical mounting level providing a convenient operator document loading level into said sheet stacking tray.

The disclosed apparatus may be readily operated and controlled in a conventional manner with conventional control systems. It is well known in general and preferable to execute such control functions and logic with readily programmable software instructions for conventional microprocessors.

In the description herein the term "document" or "sheet" refers to a usually flimsy sheet of paper, plastic, or other such conventional individual image substrate, and not to microfilm or electronic images which are generally much easier to manipulate, unless so indicated. The "document" is the sheet (the original, which may be a or previous copy) to be copied onto a "copy sheet", which may be abbreviated as the "copy". Related, e.g. page order, plural sheets of documents or copies are referred to as a "job" or "set". A "job" is a set of related sheets, usually a collated copy set copied from a set of original document sheets or electronic page images from a particular user or otherwise related. A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

As to specific components usable with the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description of one embodiment thereof, including the drawing Figure (approximately to scale).

FIG. 1, the Figure, illustrates one example of a printer and modular dual mode document imager and copy sheet feeder.

Describing now in further detail the exemplary embodiment with reference to the Figure, there is shown by way of one example an electronic document imaging and printing system 10. It is shown with a printing engine or printer 12, here having a laser or LED array 13 electronically controlled to image a photoreceptor 14 which has a suitable conventional or other image development system. The developed image on the photoreceptor 14 is conventionally transferred therefrom by an image transfer system or station 15 onto copy sheets 16 which (unless they are being duplexed) are fed on to an output of printed sheets, here illustrated by an exemplary finishing module 17. By way of illustration in this exemplary system 10, several different copy sheet input trays are illustrated, including a bypass input tray for special sheets 18, as described above and below, and regular paper trays 19a, 19b, 19c, and 19d inside the printing engine 12.

Turning now to the dual mode sheet feeder/separator system, it may be seen that this is desirably, as shown here, a separate module 20 which is integral with but removable from the printing engine 12. As illustrated here, it may desirably be at a convenient operator level or height above the floor for convenient operator use in loading. As also shown, it may be cantilevered from one side of the printing engine 12, so as to reduce the overall size of the printing engine 12 when this module 20 is removed. Furthermore, the intermediate vertical mounting position of this module 20 provides, with this particular printing engine 12, a substantially directly linear horizontal short input path into the image transfer system 15 thereof. That is, a short and substantially linear paper path for copy sheets being fed into the printing engine 12 from the module 20.

The dual mode sheet feeder/separator module 20 includes here an input sheet stacking tray 21, a sheet feeder/separator 22, a first sheet feeding path 23 and a second sheet feeding path 32. These two sheet feeding paths 23 and 32 initially share a common initial document path portion 23a from the output of the sheet feeder/separator 22, as shown. However, upon reaching a sheet path selector or gate 30, the first and second sheet feeding paths diverge and provide separate functions. The first sheet feeding path 23 continues on around to a CVT transport and platen where the documents may be imaged by an electronic document imaging station or RIS 24. The documents which are imaged then continue on through a document return path 25 forming part of this first sheet feeding path 23 to a document restacking tray 26 which is here closely adjacent to and underlying the input stacking tray 21. However, it will be appreciated, as in some other document feeders, documents may be returned to the same tray (such as 21) from which they were initially fed. In the system here, imaging of duplexed documents on their second side is provided by reversing the document output rollers 27 to feed the duplex document up past a duplex diverter gate into a duplex return or recirculation path 28. This above-described operation and function of the first sheet feeding path 23 provides a first mode of operation for document imaging.

A second and different mode of operation and function is provided by the actuation of gate 30 to divert sheets out of the end of the shared or initial document path portion 23a into a print engine input path 32 which (in this example) continues downstream of the gate 30 into a common or shared internal printer paper path portion 36 to the transfer station 15. That is, here in this second mode of operation special copy sheets may be loaded in the tray 21 and sequentially fed by the feeder 22 through path 23a and then by gate 30 into path 32 and 34 to merge into the regular sheet feeding path 36 for copy sheets 16 being fed from any of the other trays 18 or 19a–19d.

Although illustrated herein for comparative purposes, it will be appreciated that the prior art bypass tray 18 and its illustrated feeder and input path and their feed rolls is not required with the present system. All of its components may be eliminated, since its function can be performed by the tray 21, feeder/separator 22, and sheet feeding path 32 in the second mode of operation of the dual mode module 20. Furthermore, the present system provides therewith a high reliability document feeder/separator 22 for the copy sheets, and allows external stack loading and reliable copy sheet separation and feeding without requiring adding another expensive feeder/separator for that.

It will be noted that the input tray 21 can be loaded (stacked) with both documents to be imaged and copy sheets to be printed if desired, and the mode change made automatically when feeding one versus feeding the other. In a "digital copier" function, where copies are being made immediately from scanned documents, those copies may be made on copy sheets from other trays such as 19a–19d, or made in another networked printer. However, alternatively the documents can be fed and imaged first and electronically page buffered in memory in a known manner until the shared initial sheet path 23a is free of documents and may then be used to feed copy sheets to receive those, or other, page images.

Thus, although several other paper trays 18 and 19a–19d for copy sheets are illustrated here, it will be appreciated that the subject dual mode system lends itself to use in a simple small desktop or portable printing system in which a single input tray 21 or the like is the only input tray. Such a printing system may also be, or alternatively be used as, a facsimile machine.

It will be appreciated that the location of the feeding of copy sheets into the print engine could be into another portion of the internal paper path of the print engine, instead of the illustrated print engine input path 32. For example, the copy sheet input could be merging into a (well known per se) duplexing loop return path in the printer at a position on said path upstream of but merging into the common or shared internal printer paper path portion 36 leading to the transfer station 15. For example, that may be desirable if both the dual mode feeder/separator and the duplexing loop return path are adjacent the top of the machine. The particular copy sheet input path may vary with both the desired position of the dual mode feeder/separator and the internal paper paths for the particular printer.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A dual mode sheet feeder/separator system for an electronic document imaging and printing system with an electronic document imaging station, a printing engine, an externally accessible sheet stacking tray, a sheet feeder/separator for separating and feeding documents from said sheet stacking tray, and at least two selectably different sheet feeding paths for the sheets stacked in said sheet stacking tray after they are separated and initially fed by said sheet feeder/separator operatively connecting with said sheet stacking tray, said two selectably different sheet feeding paths comprising a first sheet path for feeding documents to said electronic document imaging station to be electronically imaged in a first operating mode and a second sheet path for feeding sheets to said printing engine in a second operating mode, and a sheet path selection system for selecting between said first and second sheet paths in response to selecting between said first and second operating modes, wherein in said first operating mode said sheet stacking tray contains documents to be electronically imaged and said documents are fed through said first sheet path to be electronically imaged, and wherein in said second mode said sheet stacking tray contains special copy sheets which are fed by said second sheet path into said printing engine to be printed; wherein said first sheet path for feeding documents to said electronic document imaging station to be electronically imaged in said first operating mode further includes a return path for returning said documents to be restacked ending adjacent to said sheet stacking tray.

2. A dual mode sheet feeder/separator system for an electronic document imaging and printing system with an electronic document imaging station, a printing engine, an externally accessible sheet stacking tray, a sheet feeder/separator for separating and feeding documents from said sheet stacking tray, and at least two selectably different sheet feeding paths for the sheets stacked in said sheet stacking tray after they are separated and initially fed by said sheet feeder/separator operatively connecting with said sheet stacking tray, said two selectably different sheet feeding paths comprising a first sheet path for feeding documents to said electronic document imaging station to be electronically imaged in a first operating mode and a second sheet path for feeding sheets to said printing engine in a second operating mode, and a sheet path selection system for selecting between said first and second sheet paths in response to selecting between said first and second operating modes, wherein in said first operating mode said sheet stacking tray contains documents to be electronically imaged and said documents are fed through said first sheet path to be electronically imaged, and wherein in said second mode said sheet stacking tray contains special copy sheets which are fed by said second sheet path into said printing engine to be printed; wherein said said electronic document imaging station, said sheet stacking tray, said sheet feeder/separator and said first and second sheet paths comprise an integral modular unit removably mounted to said printing engine and physically communicating therewith via said second sheet path.

3. The dual mode sheet feeder/separator system of claim 2 wherein said electronic document imaging station is electronically connected to said printing engine to provide electronic images for printing by said printing engine.

4. The dual mode sheet feeder/separator system of claim 2 wherein said printing engine has an intermediate sheet printing path and said modular unit is mounted to one side of such printing engine approximately at said vertical level of said intermediate sheet printing path, at a vertical mounting level providing a convenient operator document loading level into said sheet stacking tray.

5. The dual mode sheet feeder/separator system of claim 3 wherein said first sheet path for feeding documents to said electronic document imaging station to be electronically imaged in said first operating mode further includes a return path for returning said documents to be restacked at or closely adjacent to said sheet stacking tray.

* * * * *